United States Patent
Auerbach

(10) Patent No.: US 7,310,316 B2
(45) Date of Patent: Dec. 18, 2007

(54) TESTING DEVICE

(75) Inventor: Karl Auerbach, Santa Cruz, CA (US)

(73) Assignee: InterWorking Labs, Inc., Santa Cruz, CA (US)

(*) Notice: Subject to any disclaimer, the term of this patent is extended or adjusted under 35 U.S.C. 154(b) by 272 days.

(21) Appl. No.: 10/485,808

(22) PCT Filed: Jun. 3, 2003

(86) PCT No.: PCT/US03/17394

§ 371 (c)(1),
(2), (4) Date: Aug. 13, 2004

(87) PCT Pub. No.: WO03/102804

PCT Pub. Date: Dec. 11, 2003

(65) Prior Publication Data

US 2005/0007958 A1    Jan. 13, 2005

Related U.S. Application Data

(60) Provisional application No. 60/385,507, filed on Jun. 3, 2002.

(51) Int. Cl.
*G06F 11/00* (2006.01)
*G06F 15/173* (2006.01)
*H04J 3/16* (2006.01)

(52) U.S. Cl. ............ 370/241; 370/412; 370/466; 370/474; 340/825.53

(58) Field of Classification Search ........ 370/241–256, 370/409, 412, 474, 535, 466; 340/825.05, 340/825.52, 825.53
See application file for complete search history.

(56) References Cited

U.S. PATENT DOCUMENTS

| | | | |
|---|---|---|---|
| 5,734,659 A * | 3/1998 | Mann et al. | 370/474 |
| 6,493,319 B1 | 12/2002 | Kramarczyk et al. | |
| 2003/0088664 A1 | 5/2003 | Hannel et al. | |
| 2003/0165160 A1 * | 9/2003 | Minami et al. | 370/466 |

* cited by examiner

*Primary Examiner*—Afsar Qureshi
(74) *Attorney, Agent, or Firm*—Oppedahl Patent Law Firm LLC

(57) ABSTRACT

A test device (21) sits between two or more nodes (20, 22). The nodes (20, 22) communicate in conversations, according to some predetermined protocol. The test device (21), under user control, may introduce jitter, drop packets, create new packets, reroute packets, and reorder packets in the conversations. Particular conversations are detected and tracked by respective virtual state machines (38, 39, 40) within the test device.

56 Claims, 8 Drawing Sheets

TESTING DEVICE

This application claims priority from U.S. appl. No. 60/385,507 filed Jun. 3, 2002, which application is hereby incorporated herein by reference for all purposes.

BACKGROUND

The application relates generally to test equipment and relates more particularly to test equipment for networks, packet data, and communications links.

Historically, and more often before the time of the Internet, many networking and communications protocols were proprietary or at least administered by a controlling entity under circumstances limiting the extent to which third parties could attempt to make compatible equipment and software. In the case of a protocol or standard that was tightly controlled by a particular entity (typically a large corporation), it commonly happened that that entity took it upon itself to certify whether particular third-party equipment was or was not "compatible" with the protocol or standard. In the case of a proprietary standard or protocol it might develop that only the proprietary entity had the ability to make equipment intended to be "compatible," perhaps due to patents or due to an unpublished "standard" known only to the entity. One natural consequence was that compatibility problems and standards-compliance problems occurred relatively rarely, and another was that barriers to entry often reduced or eliminated competition in particular markets.

In more recent times, there has been a trend toward "open" standards, perhaps paralleled to some extent by "open-source" and general-public-license software. Some open standards have come to be widely adopted, in some cases providing levels cross-platform connectivity and interoperability which, as recently as twenty-five years ago, would have been difficult to imagine. For example, in recent years it has come to be possible to exchange data between almost any two operating systems with the help of IP and TCP protocols. Likewise it has come to be possible to exchange email between almost any two email systems, regardless of the designer or the underlying operating system and hardware, with the help of the RFC (request for comments) 822 standard. These trends have led to presence of multiple suppliers in some markets and improved performance and reduced prices in some markets.

If an IP packet is lost, nothing about the IP standard will detect the loss. Likewise if two IP packets happen to arrive in a different sequence than they were sent, nothing about the IP standard will detect the change in sequence. To the extent that a system designer wishes to detect and deal with lost or reordered packets, there is no choice but to do it at some protocol level above IP. IP packets do have CRC (cyclic redundancy check) checksums and thus corruption of a packet will nearly always be detected within the IP protocol level.

It is convenient to define some terms that characterize things that can go wrong in communications networks. These include the following:

Packet loss. This is simply the disappearance of a packet that was transmitted or ought to have been transmitted. Some media have mechanisms to recover lost packets (generally with some additional delay.) For purposes of this note, packets recovered by such media are not considered lost.

Packet Delay. Delay is the amount of time that elapses between the time a packet is transmitted and the time it is received. There is always delay—the speed of light in a vacuum places a lower limit on how small the packet delay can be. The actual propagation time of a packet across a telecommunication link varies considerably depending on the media.

Some media have complex access mechanisms. For example, CSMA controlled media, such as Ethernets, have fairly intricate access procedures that cause delays often larger than the raw propagation time.

In addition to propagation time, packets are delayed as the bits exit and enter computer or switch/router interfaces, as packets spend time in various queues in various switching and routing devices, and as software (or hardware) in those devices examines the packets, including any option fields, and deals with them.

Packets are sometimes delayed simply because a computer, router, or switch needs to do something else first, such as doing an ARP handshake to obtain the next hop's MAC address or looking up forwarding information.

Jitter. Jitter is a measure of the the variation in the packet delay experienced by a number of packets. Some packets may experience an unimpeded ride through the net while others may encounter various delays.

Jitter is often, but not always, accompanied by some degree of packet loss.

Jitter is important because it has a significant impact on how long software can expect to wait for data to arrive. That, in turn, has an impact on software buffering requirements. And for media streams, such as voice or video, in which late data is unusable, jitter affects algorithms that are used to create elastic shock-absorbing buffers to provide a smooth play-out of the media stream despite the packet jitter.

There are various formulas used to compute jitter. These formulas vary depending on the emphasis that one wants to put on more recent versus older transit variations.

One protocol level that is overlaid above IP and that deals with lost and reordered packets is TCP (transmission control protocol). With TCP, a connection is agreed upon between two nodes. The connection has an explicit start and (barring some extreme timeout or loss of connectivity) an explicit end. For the duration of the connection, all packets that are sent are numbered and acknowledged. For the sending node, there is an obligation to preserve a copy of each packet sent until it has been acknowledged. (There is, by definition, some upper limit on how many unacknowledged packets will be permitted to exist at any given moment.) For the receiving node, there is a need to keep track of any gap in the numbers of the received packets, so that when a missing packet finally arrives it can be placed in proper sequence relative to those numbered above and below it. (There is also, by definition, some upper limit as to how many out-of-sequence packets may be stored while the missing packet or packets are awaited.) As a matter of terminology these functions (and others, such as congestion avoidance) are carried out by what is called a "TCP stack."

With the above-mentioned trends come potential problems. Any would-be supplier of a node or network device or system (hereinafter often referred to as a "node") could offer it to the public as supposedly complying with relevant standards or RFCs, with no choke-point controller (such as a large corporation controlling a standard) to block it. This led to a natural concern as to whether a particular node or device or system was, in fact, compliant with the standard or RFC. As described by Jon Postel in RFC 1025 (September 1987):

> In the early days of the development of TCP and IP, when there were very few implementations and the specifications were still evolving, the only way to determine if an implementation was "correct" was to test it against other implementations and argue that the results showed your own implementation to have done the right thing. These tests and discussions could, in those early days, as likely change the specification as change the implementation.
>
> There were a few times when this testing was focused, bringing together all known implementations and running through a set of tests in hopes of demonstrating the N-squared connectivity and correct implementation of the various tricky cases. These events were called "Bake Offs."

With the growth of the Internet, it became impossible to carry out an "N-squared" demonstration in which each of N devices could be tested for interoperability with the other N−1 devices (and indeed with a device of its own kind), due, among other things, to N becoming very large. In the particular case of TCP connectivity, it became clear that while most TCP stacks performed their desired functions fairly reliably when presented with a connection made up of "ordinary" data, some of them did not perform well in the event of connections made up of inputs that, while standards-compliant, were somewhat out of the ordinary.

The traditional approaches to these problems include the following:

Design reviews. Designers, engineers, and programmers review a design as it is developed, hoping to assure standards compliance.

Code reviews. The actual code written by one or more programmers is discussed with additional programmers, for example with a "walk-through" of the program flow.

Protocol test suites. A standardized body of data (e.g. a data file) is fed into a system again and again to test the ability of the system to handle the data. An effort is made to include, within this data file, some fairly wide range of possible inputs.

Traffic generators. A device may be created that generates traffic (e.g. packets) according to some particular protocol, thereby testing (among other things) the bandwidth of the node being tested as well as its ability to operate for long periods of time (e.g. to test for certain categories of memory leaks).

None of these approaches suffices by itself to test fully the standards compliance of a node, and even these approaches taken together do not lead to complete confidence as to standards compliance. A design review or code review, for example, are performed by humans and thus may completely miss something important that was omitted; it is well known that humans are better at catching something that is visibly incorrect than they are at noticing that something is missing entirely. If a design or body of code is simply lacking a way to test for a boundary condition, for example, this is easy to miss.

A distinction can also be drawn between systems and code that are deterministic (that always have the same outputs given certain highly predictable inputs) and systems and code that must deal with a variety of inputs at various times (e.g. asynchronous inputs) and that must deal with potential race conditions among various circuits or data flow paths. An example of a deterministic code body is software to generate, say, daily credit card statements in batches. In the universe of computer programmers and software designers and electrical engineers and systems engineers, almost all are competent to create and to review deterministic systems and code sets. But the fraction of this universe composed of persons who are very good at reviewing the latter types of systems (systems with timing issues, race conditions, asynchronous inputs) turns out to be extremely small. Experience suggests that the need for such people far exceeds the supply. There are not enough of them, for example, to do even a small proportion of the design reviews and code reviews that would be needed to for comprehensive standards-compliance reviews of Internet-related products.

While protocol test suites are an important part of testing nodes, they cannot test all or even most of the ways in which a node may be improperly designed. Traffic generators can also be important but again are unlikely to detect subtle design errors. Some prior-art known traffic generators do not, for example, lose packets, reorder packets, corrupt packets, modify packets, create new packets, or delay transfer of packets. Prior-art known traffic generators furthermore do not do these things based upon past traffic. Such traffic generators are not designed to act as an intermediary between two nodes, are not designed to receive packets from multiple sources, do not modify packets based on predetermined or user-controlled criteria, or resend packets which have been intercepted and then modified.

One prior-art approach is described by Postel (id.):

> Some tests are made more interesting by the use of a "flakeway." A flakeway is a purposely flakey gateway. It should have control parameters that can be adjusted while it is running to specify a percentage of datagrams [packets] to be dropped, a percentage of datagrams to be corrupted and passed on, and a percentage of datagrams to be reordered so that they arrive in a different order than sent.

While such flakeways have been devised and actually used for limited testing of TCP stacks, their function has been confined to testing a single connection over a single protocol (e.g. TCP). five-tuple Further, as their function has been limited to simple manipulations only within a single protocol, they do not fully test all of the ways in which a node may fail to handle standards-compliant but infrequent events. With some more recent protocols, there are many options and variants which are within the protocol and yet which are not actually implemented in a first wave of node designs, and which may only come to be implemented in later node designs. This gives rise to a concern that a node from among the first wave may function as expected at first, but may fail to function properly as later-designed nodes commence being put into service.

As an example, in fairly recent times it has been proposed to communicate voice information over IP (VoIP). Large portions of the Internet, and many nodes on the Internet, predate VoIP and this raises the natural question whether the existing enterprise network can support VoIP with acceptable voice quality. This raises another natural question namely under what conditions voice quality will be impaired. For example, dynamic routing protocols such as BGP can lead to abrupt changes in the routing of packets during a particular voice conversation, raising the question of how the terminal equipment will handle such changes. Protocols used for VoIP permit the use of any of a number of "codecs" (coders/decoders) which define the manner in which analog signals are converted to digital and later converted back to analog; the protocols further permit shifting dynamically (during a particular voice conversation) from one codec to a different codec. Will such shifts be handled properly? Prior-art test devices do not provide full answers to these questions.

Yet another problem of long-standing duration arises from the development of standards which define more than one connection running in parallel (simultaneously). Consider a protocol which defines one connection to pass audio data and another connection to pass video data. Each connection, somewhat analogous to TCP, has mechanisms for detection of and dealing with missing packets. (Depending on the type of data being passed, such as audio data, the protocol may not actually bring about a retransmission of a dropped packet but may instead take some other action such as interpolating the audio signal for the interval represented by the dropped packet.) But it is not enough for each connection, taken by itself, to deal with dropped or delayed or out-of-order packets. There is an additional need, in the example of an audio path and a video path, for the rendered video (perceived by a human) and the rendered audio (again perceived by the same human) to be synchronized. Existing test devices do not fully test this requirement and there is a long-standing need for test devices which would fully test this requirement.

Yet another problem of long standing arises from the fact that there are whole categories of design mistakes that are simply not detected if the suite of tests is limited to dropped, delayed, corrupted, duplicated or reordered packets. There is a long-standing need for test devices which would detect more nearly all of the possible design mistakes in modern nodes that are intended to be compliant with present-day standards.

SUMMARY OF THE INVENTION

A test device sits between two or more nodes. The nodes communicate in conversations, according to some predetermined protocol. The test device, under user control, may introduce jitter, drop packets, create new packets, modify packets, reroute packets, and reorder packets in the conversations. Particular conversations are detected and tracked, for example by respective virtual state machines within the test device. The test device is "stateful" with respect to the protocol; actions taken with respect to a present packet can be based upon past traffic. Importantly, actions may be taken with respect to packets in a first particular conversation based upon past traffic in a second contemporaneous or previous second particular conversation.

DESCRIPTION OF THE DRAWING

The invention will be described with respect to a drawing in several figures, of which.

DETAILED DESCRIPTION

Figure 1:
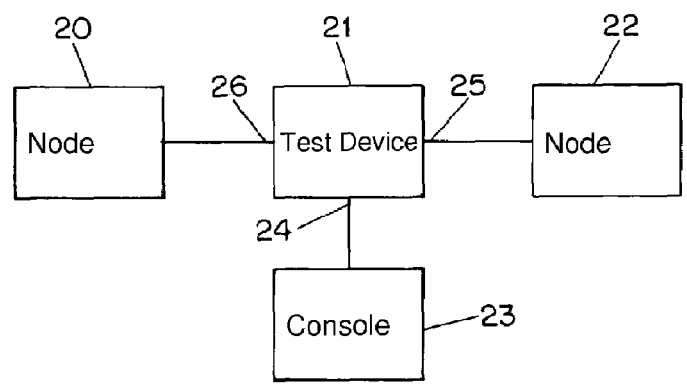
FIG. 1 is a functional block diagram showing use of a test device according to the invention.

Turning first to FIG. 1, what is shown is a functional block diagram depicting use of a test device 21 according to the invention. The test device 21 sits between nodes 20 and 22. So far as nodes 20 and 22 are concerned the connection is (or is assumed to be) "transparent" in the sense that each of nodes 20 and 22 will be under the impression it is communicating directly with the other. A console 23 communicates with the test device 21, for example through a console port 24. Nodes 20 and 22 connect with ports 26 and 25, respectively, of the test device 21.

Those skilled in the art will appreciate that the term "port" in this context will very often refer to a physical port. But in some embodiments, the ports 26 and 25 could be distinct virtual circuits or VLANs (virtual LANs) within a single physical port.

Figure 7:
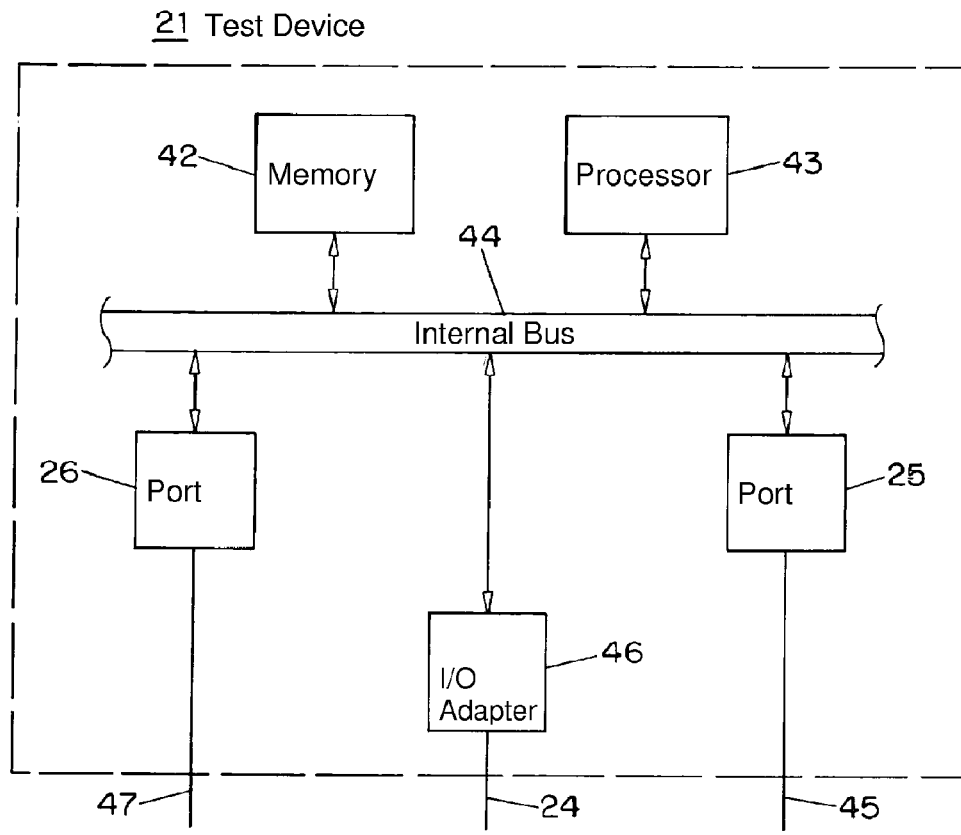
FIG. 7 is a functional block diagram of an embodiment of a test device from a hardware point of view.

Test device 21 is portrayed in some level of internal detail in FIGS. 7 and 8 as will now be described. FIG. 7 is a functional block diagram of an embodiment of a test device 21 from a hardware point of view. Ports 26, 25, and 24 have I/O adapters 47, 45 and 46 respectively. In many embodiments these will conveniently be ethernet adapters but can be any appropriate I/O adapter depending on the types of communications channels connected to the ports. The I/O adapters may communicate in bidirectional fashion with an internal bus 44 which is preferably a very high speed bus. Memory 42 may be communicatively coupled with the bus 44, and thus with processor 43 which is preferably a very high speed processor. In an exemplary embodiment there are two processors.

Those skilled in the art will readily appreciate that the particular internal architecture employed is not critical to the invention, and that indeed with appropriate software and/or firmware any of a variety of internal architectures may be employed. The test device 21 may, for purposes of convenient manufacture, be essentially a general-purpose computer of appropriate processing power and with a desired number and types of ports, running software that is written to bring about the results described herein. The software receives configuration inputs from a human user through a user interface such as the console 23 mentioned above in connection with FIG. 1. The configuration inputs determine which of a variety of perturbations are induced in the communications between nodes 20, 22 in FIG. 1, as well as the severity of the perturbations.

As will be described in further detail below, software routines may be written from time to time, and loaded into the memory of the test device 21, to bring about particular more complex perturbations for example relating to two or more connections or conversations or sessions.

Figure 8:
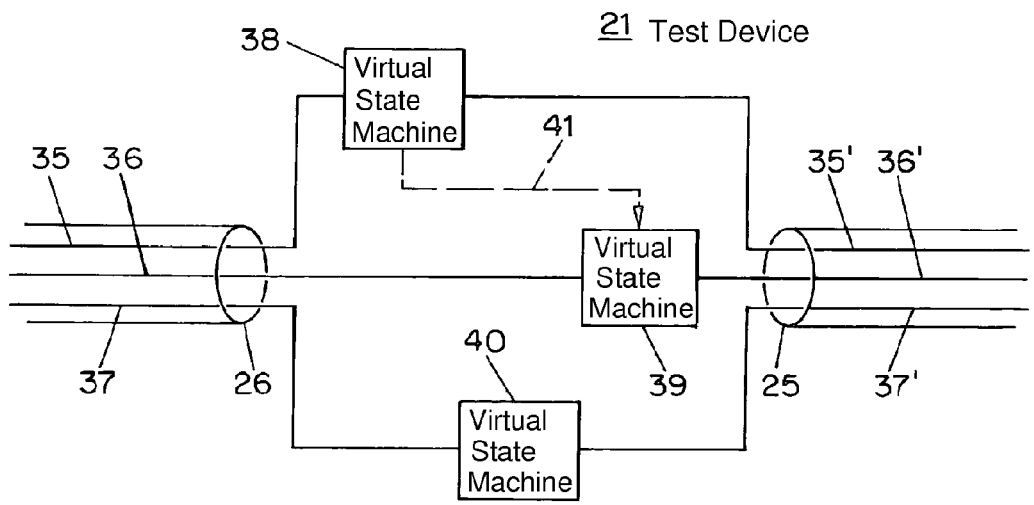
FIG. 8 is a functional block diagram of an embodiment of a test device from a virtual state machine point of view.

FIG. 8 is a functional block diagram of an embodiment of a test device from a virtual state machine point of view. Port 26, in an exemplary embodiment, carries layer-2 packets such as ethernet packets, which in turn may contain IP packets. Some of the IP packets may make up a conversation 35; other IP packets may make up a conversation 36, and still others may make up a conversation 37. In this context a "conversation" may mean a session such as a TCP or HTTP session, and more generally simply means a logical construct that is used to partition traffic. Many, but not all, types of conversations are explicitly session-oriented from the point of view of the protocol designer. When we refer to a second protocol overlaid upon a first protocol, for the first protocol we are typically considering at ethernet packets or IP packets, and we are discerning the existence of a conversation according to some higher-level construct or interaction defining a second protocl. We say that the higher-level construct or interaction is "overlaid" upon the first protocol.

Likewise port 25 is carrying for example layer-2 packets such as ethernet packets, which may in turn contain IP packets, which variously make up connections 35', 36', and 37'.

At a particular moment the number of conversations may be zero or one or two or three or some greater number. As described above a particular conversation may come into existence and may at some later time come to an end. Preferably the IP packets are inspected in a stateful way by processor 43 (FIG. 7) and when a new conversation (for example 35 and 35' in FIG. 8) comes into existence, a corresponding virtual state machine 38 is created within the test device 21. In FIG. 8 it is portrayed that a second virtual state machine 39 has been created to interact with the conversation 36 and 36'. In FIG. 8 it is also portrayed that a third virtual state machine 40 has been created to interact with the conversation 37 and 37'. In a typical embodiment a new virtual state machine will be spawned each time a new conversation is caused to come into existence. Within a given conversation at some first protocol layer there may be additional conversations defined with respect to some higher protocol layer, and each of these will, in a typical embodiment, cause the spawning of yet another virtual state machine, preferably defined as a child process with respect to the state machine at the first protocol layer. When a conversation comes to an end, in a typical embodiment the virtual state machine associated with it will cease to exist.

It should also be noted that logically it is possible to combine any two state machines into a single state machine, and in many cases it is possible to take described functions of a single state machine and split them up to be performed by two or more state machines. It should likewise be noted that in an exemplary embodiment not only are there state machines spawned due to newly established conversations, but also there are state machines existing from the outset; such "prime mover" state machines cause creation of some later additional state machines.

Again it may be emphasized that from the point of view of the nodes (e.g. 20 and 22 in FIG. 1) that communicate through connection 35, 35', the nodes are communicating transparently; they do not know that test device 21, or state machine 38, are serving as intermediaries to the connection.

Each virtual state machine will, in an exemplary embodiment, be able to induce such perturbations as packet jitter, duplicated packets, dropped packets, and out-of-sequence packets, thereby testing the ability of the nodes to preserve the connection, much as was described above with respect to TCP connections. Importantly, and as described in more detail below, the virtual state machines will be user-configurable to define interactions therebetween, portrayed for example by causal link or signal 41 in FIG. 8.

It will be appreciated that while a convenient and suitable programming technique is to create and destroy virtual state machines within an execution space of a processor 43 (FIG. 7), those skilled in the art will have no difficulty devising other combinations of hardware and software that achieve the same results (when viewed from the outside of test device 21) as the results described herein, without deviating in any way from the teachings and benefits of the invention.

It will be appreciated that nothing about the invention requires that the user interface (console 23 and port 24) be exactly that shown in FIG. 1. The user interface may be a telnet session or may preferably be a web-based interface. Such a telnet session or web-based interface may communicate to the test device 21 through one of the ports 25, 26, for example, although preferably the communication will be through a port that is other than the ports 25, 26 that connect to the nodes under test 20, 22.

Figure 2:
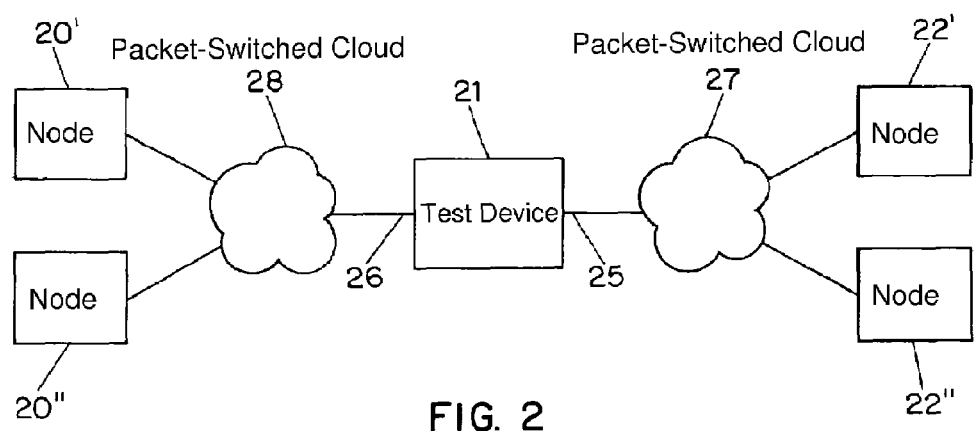
FIG. 2 is a functional block diagram showing an alternative use of a test device according to the invention.

It will also be appreciated that nothing about the invention requires there to be two nodes under test 20, 22. The number of nodes under test may be other than two. The number of ports 25, 26 may be other than two. For nearly all cases of interest, however, the number of nodes under test, and the number of ports for connection to nodes under test, will be at least two. FIG. 2, for example, shows an embodiment in which the test device 21 connects to two packet-switched clouds 27, 28 which may for example be ethernets, frame relay clouds, ATM clouds, or IP internets. Connected to each cloud may be one or more nodes 20', 20", 22' or 22".

In some cases it may be useful to configure the test device 21 to receive and send packets over a single port on a network. For example there may be two IP subnets on a local area network and the test device 21 may receive packets on one subnet, process them, and transmit them on the other subnet, and vice versa.

Figure 3A:
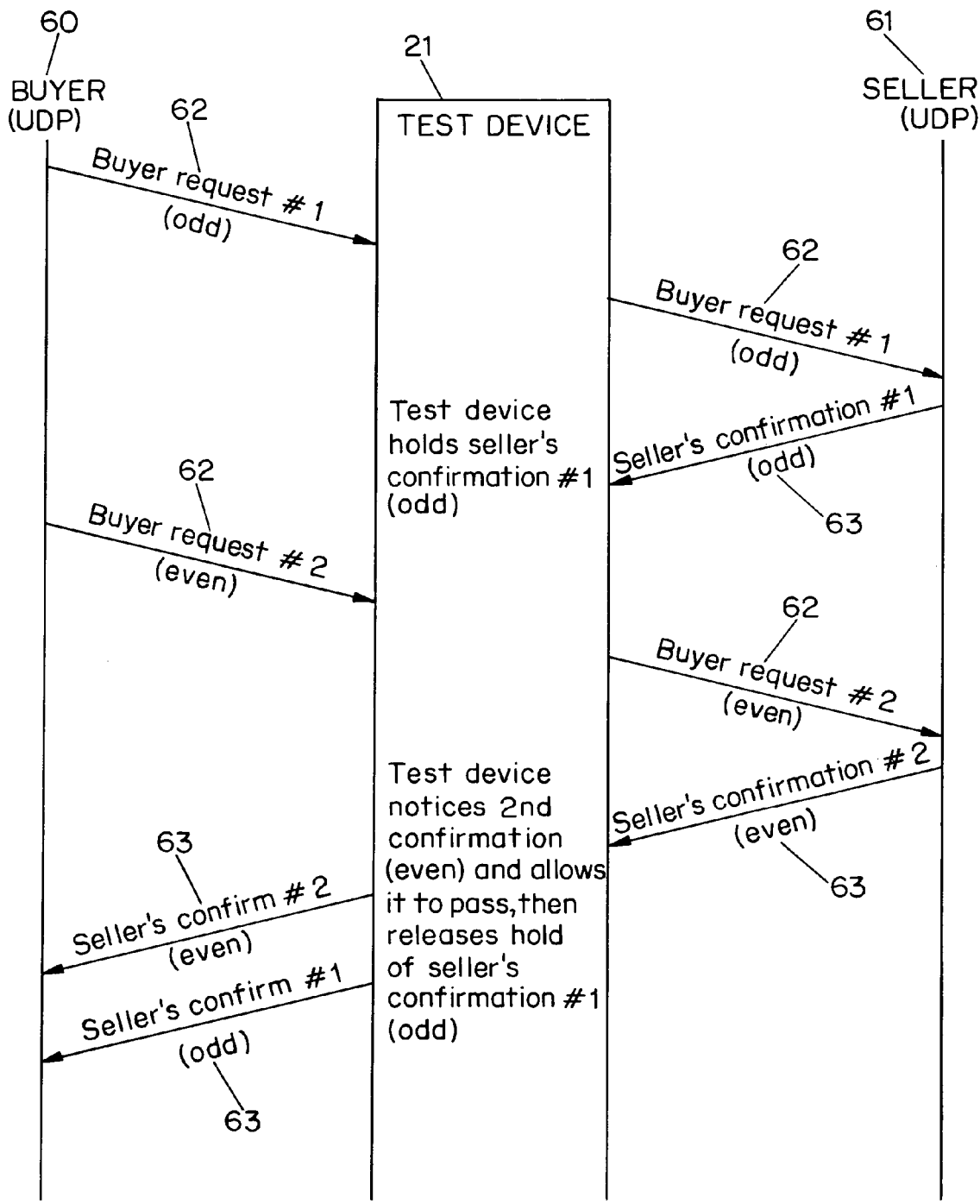
FIGS. 3A and 3B are a ladder diagram showing data flow in a simple buy/sell protocol.
Figure 3B:
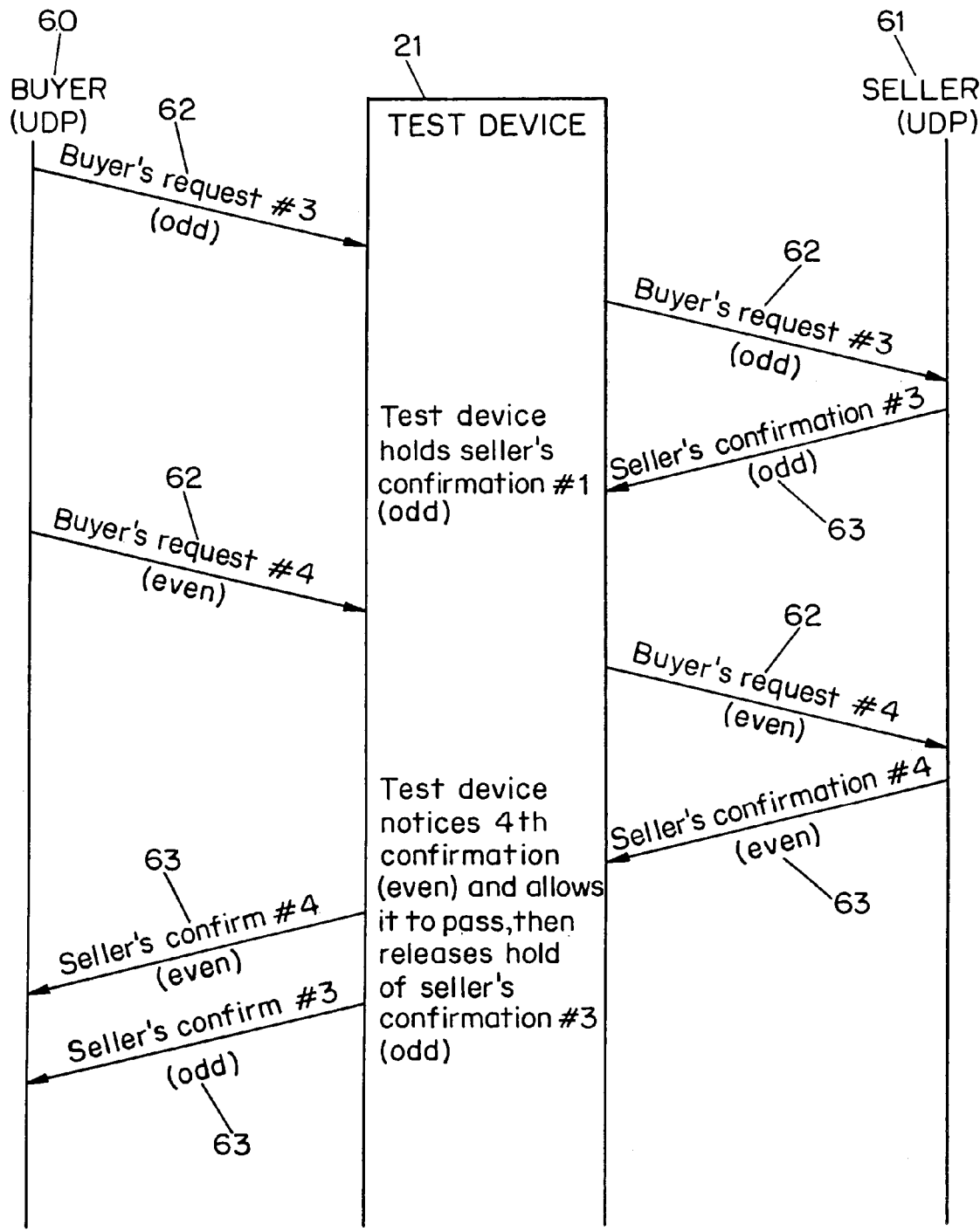

Turning now to FIGS. 3A and 3B, what may be seen is a ladder diagram showing data flow in a simple buy/sell protocol. To illustrate the capabilities of the test device, this first embodiment describes a simple exemplary buy/sell protocol. The protocol in this example is simplified for purposes of illustration, but those skilled in the art will appreciate that there are many protocols in use on the Internet that are this simple and to which the invention's teachings and benefits apply.

It was mentioned above that one protocol commonly overlaid upon the IP protocol is TCP, in which packets are numbered and missing packets are retransmitted. Another protocol overlaid upon IP is User Datagram Protocol or UDP. The buy/sell protocol depicted in these figures is a simple exchange of UDP packets in which a buyer 60 issues what amounts to an electronic purchase order and the seller 61, upon receipt of the order, acknowledges the order, ships the product, and charges the account of the buyer 60. The buyer 60 sequentially numbers the transactions. If the buyer 60 fails to get a response from the seller 61 within a reasonable time, the buyer 60 reissues the purchase order with a new sequence number.

In this embodiment the test device 21 monitors the transactions. The test device 21 lets the purchase order packets 62 from the buyer 60 pass through unchanged.

However, the test device 21 processes the acknowledgment packets 63 of the seller 61 according to the following algorithm:

If transaction number is odd

```
then {
    Place seller's acknowledgment packet
    into a holding container rather than
    forwarding it to buyer.
}
else { // Transaction number is even
    Forward seller's acknowledgment packet
    to buyer.
    Release and forward to buyer any
    odd-numbered seller acknowledgment
    packets that are being held.
}
```

The end result is that the buyer 60 and seller 61 double-buy and double-sell every item, something ill-suited to creation and persistence of a satisfactory business relationship.

This embodiment demonstrates the ability of the test device 21 to respond to protocol data and protocol state, and to modify protocol behavior, as perceived by the communicating entities (in this case the buyer 60 and seller 61). This relies upon the ability of the test device 21 to track each connection as it comes into existence and progresses through the internal states of the connection. Returning to FIG. 8, a typical approach is to spawn a new state machine 39 when the connection of buyer request 1 begins, and a new state machine 38 when the connection of buyer request 2 begins. State machine 39, under program control and based upon user configuration, then temporarily freezes confirmation number 1 until a causal signal 41 is received, here a signal that buyer request 2 and seller confirmation 2 have been communicated pursuant to a protocol connection. After seller confirmation 2 is communicated, causal signal 41 is sent and state machine 39 releases confirmation number 1. Yet another state machine, omitted for clarity in FIG. 8, may keep count of the buy/sell protocol sessions so as to know whether a particular session is even-numbered or odd-numbered, so as to set up the causal signals 41 in the manner described in the algorithm set forth above.

This embodiment, although artificially simplified, is demonstrative of the kind of testing that may be applied to products to make them more robust should interactions across the network be different than those in the developer's lab and testbed.

Stated differently, what is described is a method for use with apparatus having first and second ports passing data therebetween according to a first packet-oriented protocol, and for use with a second packet-oriented protocol overlaid upon the first protocol, the method comprising the steps of: detecting initiation of a first conversation according to the second protocol; responsive to the detection, creating a respective first virtual state machine; by the first virtual state machine, delaying a packet of the first conversation; detecting initiation of a second conversation according to the second protocol; responsive thereto the detection, creating a respective second virtual state machine; by the second virtual state machine, emitting a causal signal upon a predetermined event in the second conversation; by the first virtual state machine, releasing the delayed packet in response to the causal signal. In this example the detection of the second conversation is subsequent to the detection of the first conversation.

In another embodiment the action taken by the first state machine may be a manipulation upon a packet of the first conversation, the manipulation selected from the set consisting of delay, drop, reordering, creation, modification, re-encapsulation, corruption, and duplication. In this context "corruption" may for example mean changing one or more bits so that a CRC checksum fails. "Modification" may mean changing one or more payload bits within a packet, and recalculating a CRC so that so far as the CRC is concerned, the packet is not defective. The change of the payload bit or bits may intentionally violate some protocol, for example. Re-encapsulation may mean extracting a payload from an encapsulated packet, and re-encapsulating it, for example with IP tunneling or point-to-point-tunneling-protocol ("PPTP") tunneling.

Fragmentation. As is well known to those skilled in the art, each IP packet is passed from an originating node, through (typically) multiple routers, to a destination node. Neither the sender nor the receiver is permitted to make any assumptions about the capabilities of the routers nor any assumptions about the data links connecting the various routers to each other. The sender may select a packet size for each IP packet within certain ranges of possible size. If the packets are chosen to be too small, then the ratio of "payload" to packet size worsens. If the packets are chosen to be too large, then routers along the way and communications links along the way may be poorly suited to carry packets of such size. For all these reasons, the IP protocol defines a process of packet "fragmentation" in which a router can take an IP packet of a given size and fragment it into smaller packets, each presumably well suited to the link that will carry packets to the next router along the way to the destination. Likewise a router that receives IP packets must carry out a defined behavior of "reassembly" whenever fragmented packets are received.

If users are to enjoy good performance from an internet (an IP network), it is extremely important that routers perform fragmentation and reassembly faithfully with minimal or no error and with minimal or no dropping of packets. Testing routers for such performance is not, however, done very thoroughly by known prior-art test equipment and techniques.

Figure 4A:
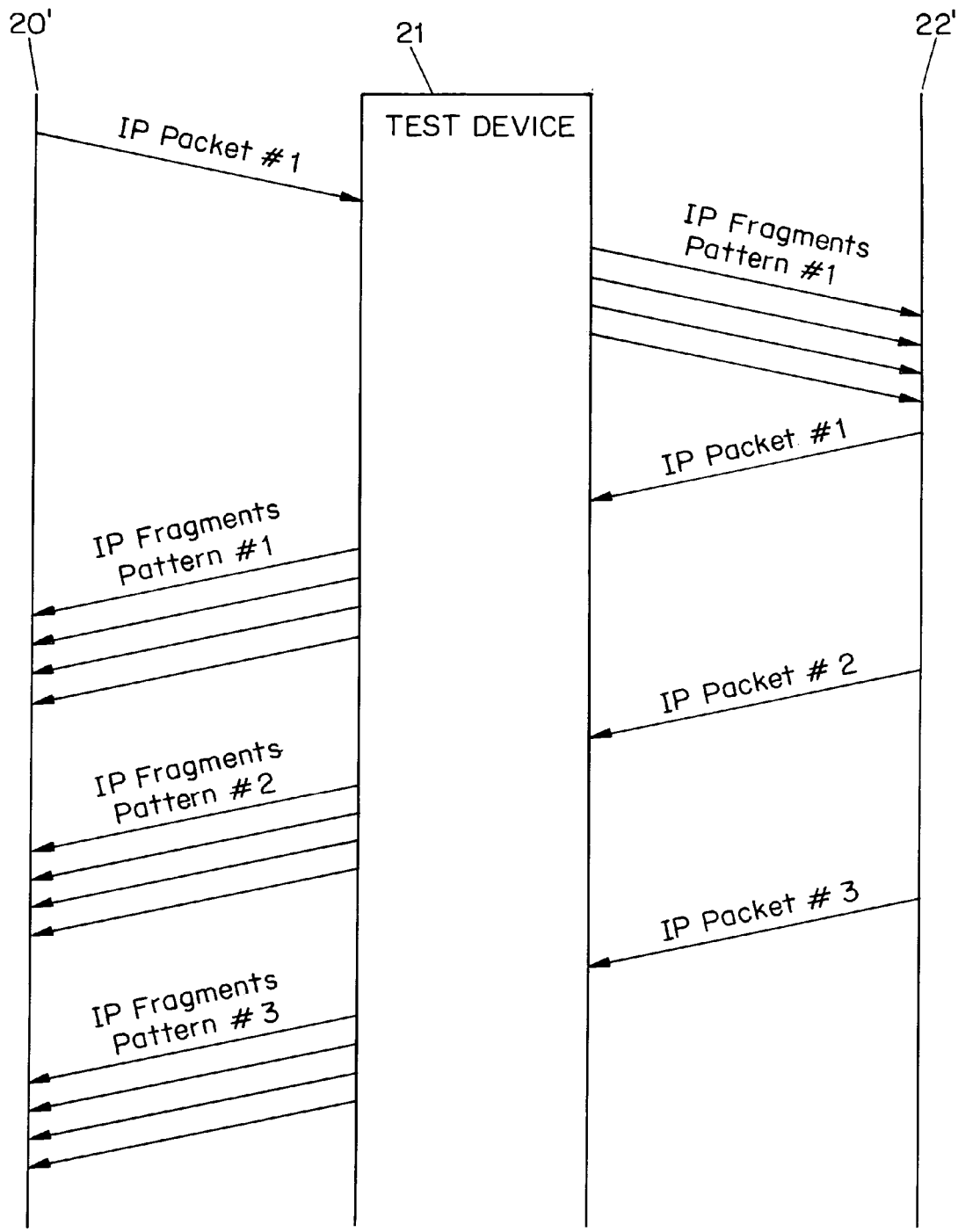
FIGS. 4A and 4B are a ladder diagram showing data flow in an exercisor for IP fragmentation.
Figure 4B:
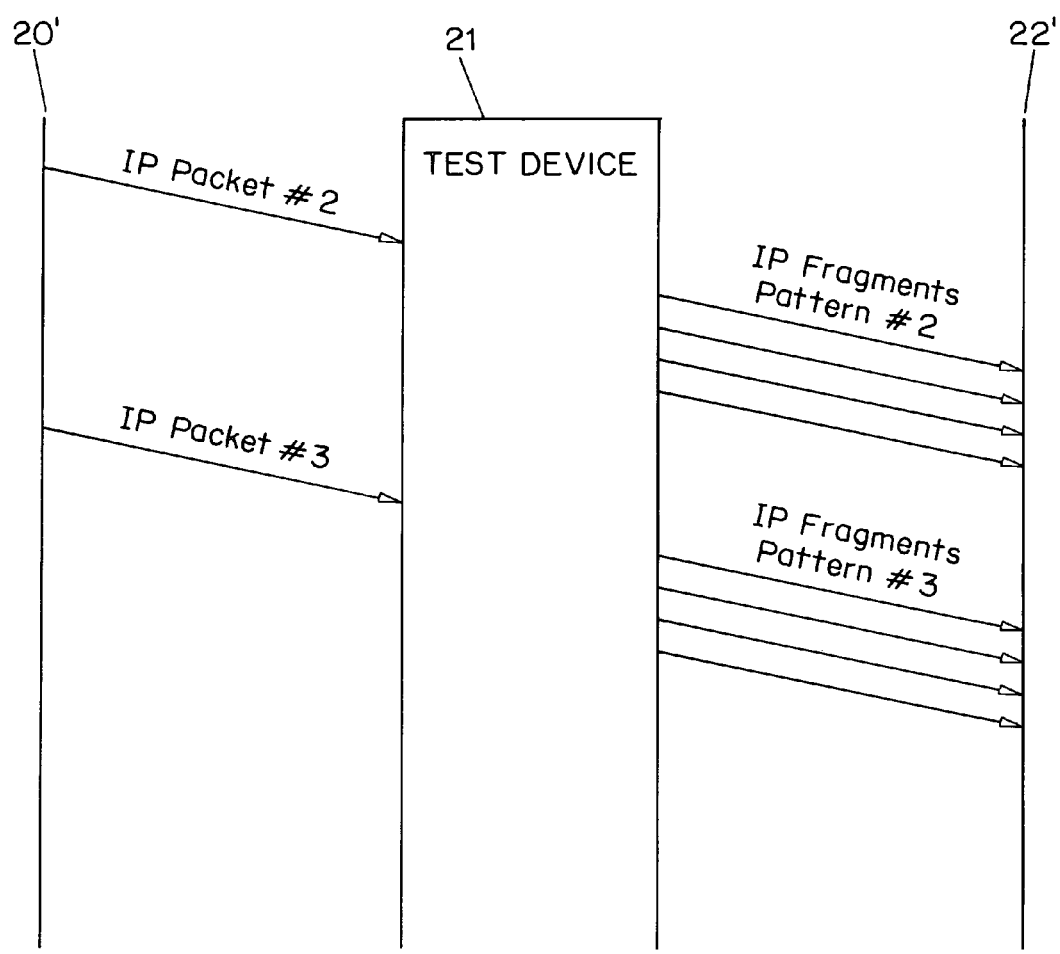

FIGS. 4A and 4B are a ladder diagram showing data flow in an exerciser for IP fragmentation according to the invention. In this embodiment of the invention what is shown is a test of product implementation quality in the face of legitimate (i.e. standards compliant) fragmentation of IP packets.

As mentioned previously, the IP protocol allows IP packets to be broken into fragments as they flow through the network. There are many ways that this fragmentation may occur. In particular, it is possible that the receiver may receive fragments that overlap and the fragments may arrive in any order. The ability of receivers of these fragments to reassemble them back into full IP packets under a broad range of these conditions is often insufficiently tested.

In this embodiment, the test device 21 is placed between two communicating entities such as 20' and 22' in FIG. 2. The test device 21 fragments the IP packets as they flow through the test device 21. However, rather than following a single pattern for generating fragments, the test device 21 will use a different fragmentation approach for each packet. As shown in FIG. 4A, from node 20' an IP packet 1 is emitted. Test device 21 fragments it according to a first fragmentation pattern. From node 22' an IP packet 1 is emitted, and test device 21 fragments it according to a first pattern and passes the fragments to node 20'. From node 22' an IP packet 2 is emitted, and test device 21 fragments it according to a second pattern and passes the fragments to node 20'. From node 22' an IP packet 3 is emitted, and test device 21 fragments it according to a third pattern and passes the fragments to node 20'.

Stated differently, what is described is a method for use with apparatus having first and second ports and for use with a packet-oriented protocol, the method comprising the steps of: receiving a first packet at the first port; fragmenting the first packet according to a first pattern; passing said fragments out of the second port; receiving a second packet at the first port; fragmenting the second packet according to a second pattern different from the first pattern; passing said fragments out of the second port; receiving a third packet at the first port; fragmenting the third packet according to a third pattern different from the first pattern and different from the second pattern; and passing said fragments out of the second port.

This use of the test device 21 as described here provides developers and testers with a controllable, deterministic, and repeatable mechanism to evaluate the behavior of IP fragment reassembly code under a range of conditions.

In the diagram only a few of several possible fragmentation patterns are shown. The order in which these fragmentation patterns are applied may be controlled by any number of conditions. In the diagram the test device 21 simply steps through the fragmentation patterns, applying one pattern on the first packet, the next pattern to the $2^{nd}$ packet, the third pattern to the $3^{rd}$ packet, and so on. When the patterns have all been applied, the cycle of patterns begins again at the start.

The fragmentation patterns shown in the diagram are as follows

Pattern 1. The original packet is broken into a set of fragments such that each fragment except the last is of maximal size; there is no data overlap between fragments. These fragments are transmitted so that the first fragment sent contains the first data bytes from the original IP packet, the second fragment sent contains the next data bytes, and so forth.

Pattern 2. The original packet is broken into a set of fragments such that each fragment except the last is of maximal size; there is no data overlap between fragments. These fragments are transmitted so that the first fragment sent contains the last data bytes from the original IP packet; the second fragment contains the next-to-last data bytes, and so forth. This forces the receiving node to save up the packets and to reorder them when reconstructing the original packet.

Pattern 3. The original packet is broken into a set of fragments such that each fragment except the last is of maximal size; the data in each fragment overlaps the data in its neighboring fragment. These fragments are transmitted so that the first fragment sent contains the first data bytes from the original IP packet, the second fragment sent contains the next data bytes, and so forth. This forces the receiving node to calculate how much of each packet to discard when splicing it to a subsequent packet in the process of reconstructing the original packet.

Those skilled in the art will appreciate that the list of patterns described here is meant to be illustrative and is not exhaustive of the patterns that are possible.

It will be appreciated that known prior-art test devices are not able to perform the steps set forth here. Test device 21 maintains an internal state to cycle through and among various fragmentation patterns. Each packet preferably spawns a respective state machine (38, 39, 40 in FIG. 8) which performs steps to fragment the associated packet and to emit the fragments in the direction of the receiving node 22'. Each state machine corresponding to a packet may pass a message to the next-created state machine to let it know where in the cycle it fits. Alternatively a state machine may count through the cycle and each newly created packet state machine may consult the counter state machine to find out where in the cycle it is to fit.

At present, many and perhaps most VoIP systems use a so-called "Real-time Transport Protocol" (RTP) together with a so-called "Real-time Transport Control Protocol" defined in RFC 1889.

RTP/RTCP is a protocol that is designed to be very flexible and, as a consequence, it has many optional fields and interactions. Few, if any, products use all of these fields or engage in all possible interactions. However, as new RTP/RTCP-based products come to market they will probably incorporate some of these previously rarely used fields and interactions. The question arises: How will the existing RTP/RTCP based equipment react to the introduction of the newer gear? In particular, will the older gear demonstrate poor behavior or even fail when it attempts to interoperate with the new equipment that uses these previously unseen (but perfectly legitimate, as measured by conformance with Internet Standards) RTP/RTCP options and interactions?

The susceptibility of network equipment to the presence of rarely used options and settings is well known. Over the years crackers have occasionally brought down equipment by launching "Christmas tree" packets (all option bits set), "Kiss-of-Death" ("KOD") packets (unusual data fields, such as lengths of zero), and "Orville Redenbacher" packets ("every kernel pops").

Figure 5:
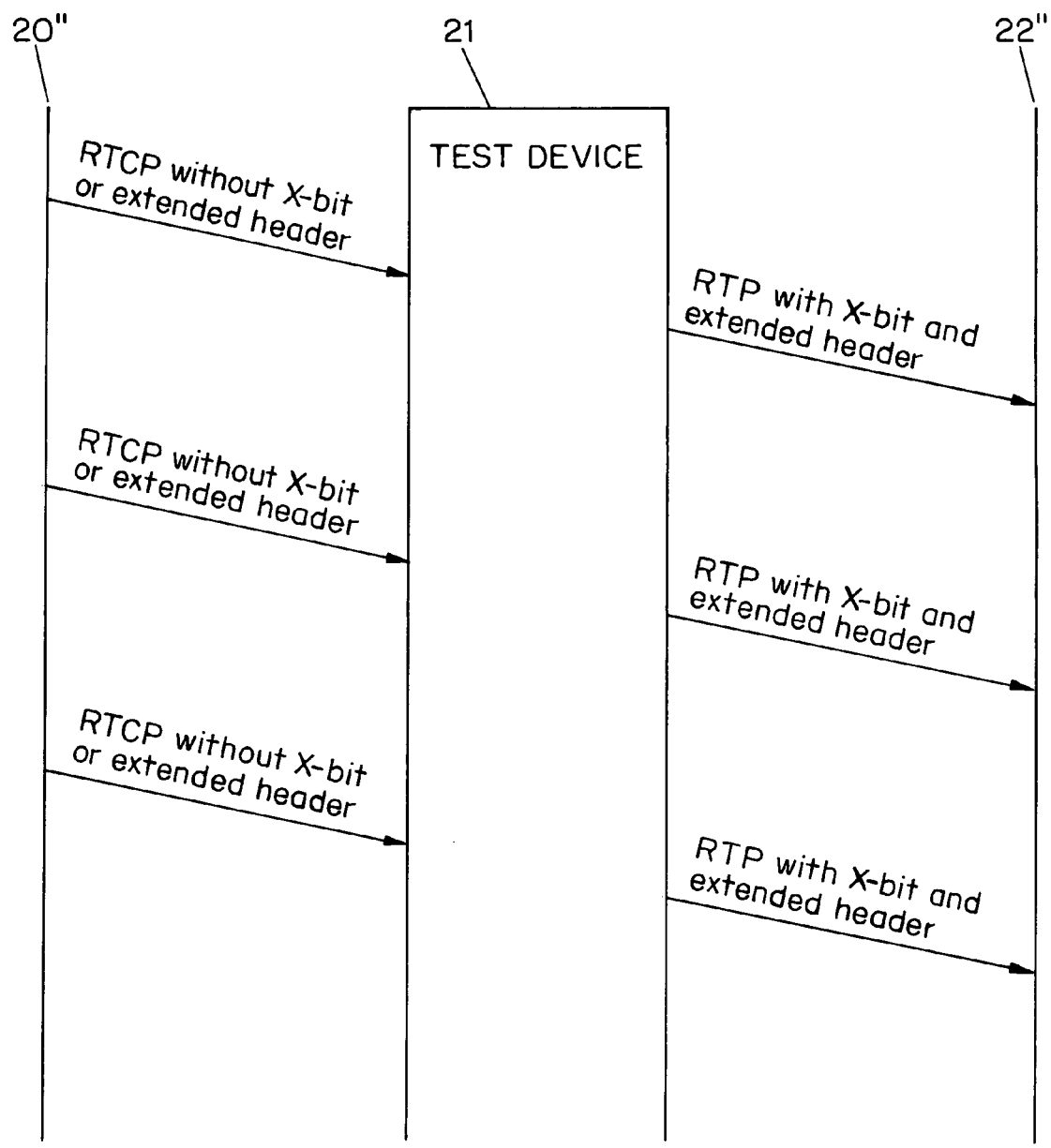
FIG. 5 shows a first test approach for an RTP/RTCP protocol.

FIG. 5 shows a first test approach for an RTP/RTCP protocol according to the invention. This approach is intended to be a test of product reliability when nodes are presented with unusual but legitimate (that is, standards-compliant) options.

In this embodiment a vendor that wants to evaluate the susceptibility of an existing product to new protocol features could use the test device 21 to introduce those new protocol features into the packet exchange between existing products. In essence, the test device may be used to enhance and extend the protocol operations emitted by an existing product so that it may behave like an instance of a yet-unbuilt product. For example the RTP/RTCP protocol defines within each packet a so-called "X" bit which, if present, indicates that a so-called "extended header" is provided in the packet. At present, neither the "X" bit nor the extended header is in common use. Most existing RTP/RTCP devices have had little if any testing to see how they behave when these settings are used.

It is assumed that it is desired to test the ability of RTP/RTCP device 22" to be able to handle packets in which the "X" bit has been set and in which an extended header is used. It is further assumed that devices that emit such packets are in short supply or are nonexistent. In this embodiment it is assumed in particular that RTP/RTCP device 20" emits packets that do not use the extended header and thus emit packets in which the "X" bit is not set.

Importantly, the test device 21 is being used to set the "X" bit in the RTP/RTCP (RFC1889) packets and add to a corresponding extended header to one direction of the packet flow (and it also recomputes UDP and IP checksums). This permits testing to see whether device 22" is able to handle X bits and extended headers.

Those skilled in the art will appreciate that when audio information such as voice is being passed over a digital communications channel, it is desirable not merely to convert analog into digital and back again, but is particularly desirable to code and decode (typically, to compress and decompress) the audio signal. The transformations applied are termed "codecs" and each codec is designed to optimize particular parameters. One codec may consume some amount of bandwidth and reproduce human speech with high fidelity, a different code may sacrifice some fidelity to be able to pass over a channel having less bandwidth. Yet another codec may be optimized for music, or for environments with substantial background noise. Finally, codecs differ in the dynamic range that is supported. Not every node supports all possible codecs and thus some negotiation may be needed to identify and agree upon a codec supported by both nodes. Changes in conditions (e.g. ambient noise level, network congestion) may make it desirable to be able to shift the codec being employed.

The RTP/RTCP (RFC1889) protocol used for Voice-over-IP (VoIP) has mechanisms (RTCP "Receiver Reports") that are at present rarely used, but which, when used, to allow the sender of voice data to shift to another codec depending on how well the receiver(s) are handling the existing codec. This switch may occur at any time, even in the middle of a conversation. A reasonable time for this to occur is during a period of silence, such as happens when a speaker pauses or is listening to the other speaker. It is, of course, desirable to be able to test VoIP nodes to find out whether they comply with the parts of the protocol relating to shifts in codec. Such testing may not be easy using existing VoIP nodes because they may not engage in such shifts. Stated differently, it may turn out that no VoIP nodes with this ability may yet have been built.

Figure 6:
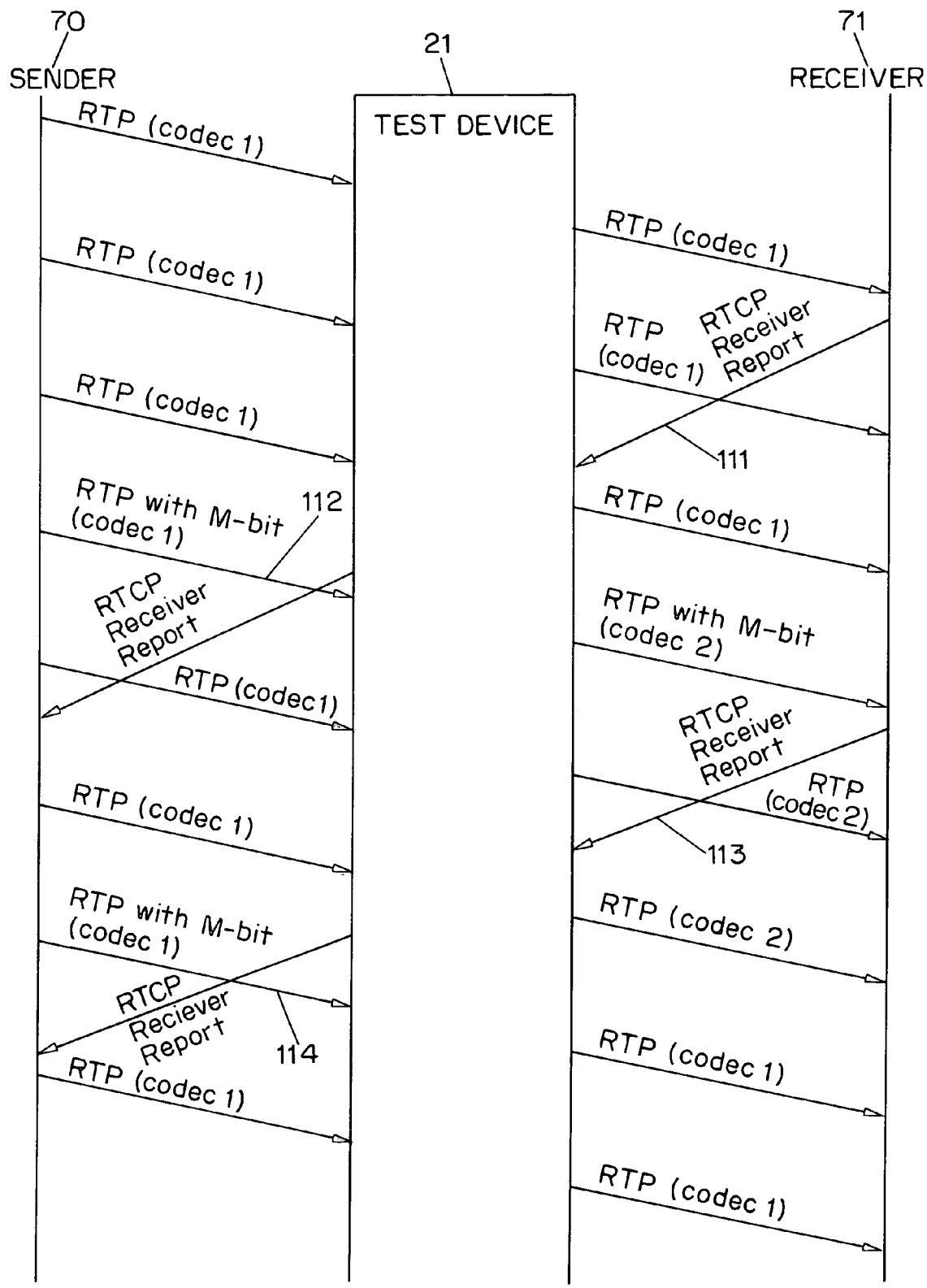
FIG. 6 shows a second test approach for an RTP/RTCP protocol.

To this end, FIG. 6 shows a second test approach for an RTP/RTCP protocol. In this embodiment, two VoIP phones 70, 71 are handling a conversation. It is assumed for purposes of this example that these phones 70, 71 do not themselves initiate codec changes in mid-stream. However, even if they do not initiate codec changes, it is desirable that they gracefully handle such changes initiated by other phones not yet built (but which are expected to be built in future).

In this embodiment, the packet flow will be modified so that the receiver 71 of the modified packets perceives a series of legitimate (as measured by conformance to Internet Standards) changes of the codec. To simplify the exposition, in this embodiment one side of the conversation will be designated as the "sender" 70 and the other as the "receiver" 71.

In real life, of course, the situation is symmetrical and the test device 21 could modify traffic in both directions, if desired.

To perform this test the test device 21 will look for two things in sequence:

- An RTCP "Receiver Report" packet 111 emitted by the receiver 71 to the sender 70. (RTCP "Receiver Reports", among other things, contain information concerning how well the receiver(s) are receiving and handling the sender's data These Receiver Reports are intended to give the sender 70 information upon which the sender 70 may elect to change how it is sending the data.
- The presence of an RTP "M" (Marker) bit in a packet 112 flowing from the sender 70 to the receiver 71. (Sending phones 70 are permitted to use the "M" bit to indicate the end of a period of silence and the start of a "talk spurt.")

After detection of the receiver-to-sender RTCP Receiver Report packet 111 followed (perhaps after one or more intervening packets) by a sender-to-receiver RTP packet 112 containing the "M" bit, the test device 21 will begin re-encoding the RTP packets so that the voice sample is converted from the routine codec 1 to an alternative codec 2. After a subsequent receiver-to-sender RTCP Receiver Report packet 113 and another sender-to-receiver "M" bit packet 114, the test device 21 will stop rewriting the data and will allow the conversation to return to the original codec 1.

Stated differently, what is described is a method for use with apparatus having first and second ports and for use with a packet-oriented protocol, the method comprising the steps of: detecting a first packet of a first predetermined type passing from the second port to the first port; passing second packets encoded with a first codec from the first port to the second port; detecting a predetermined event relating to said second packets; thereafter translating said second packets from being encoded with said first codec to being encoded with a second codec differing from the first codec, as the second packets pass from the first port to the second port.

Those skilled in the art will have no difficulty devising myriad obvious variants and improvements upon the embodiments set forth here, none of which deviate from the invention and its teachings and benefits, and all of which are intended to fall within the scope of the claims which follow.

The invention claimed is:

1. Apparatus having first and second ports passing data therebetween according to a first packet-oriented protocol;
the apparatus having first means detecting initiation of a first conversation according to a second packet-oriented protocol overlaid upon the first protocol and, responsive thereto, for creating a respective first virtual state machine, the first virtual state machine disposed to delay a packet of the first conversation;
the apparatus having second means detecting initiation of a second conversation according to the second protocol and, responsive thereto, for creating a respective second virtual state machine;
said second virtual state machine disposed to emit a causal signal upon a predetermined event in the second conversation;
the first virtual state machine disposed to release the delayed packet in response to the causal signal.

2. The apparatus of claim 1 wherein the initiation of the second conversation is subsequent to the initiation of the first conversation.

3. A method for use with apparatus having first and second ports passing data therebetween according to a first packet-oriented protocol, and for use with a conversation-oriented second packet-oriented protocol overlaid upon the first protocol, the method comprising the steps of:
detecting initiation of a first conversation according to the second protocol;
responsive to the detection, creating a respective first virtual state machine;
by the first virtual state machine, delaying a packet of the first conversation;
detecting initiation of a second conversation according to the second protocol;
responsive thereto the detection, creating a respective second virtual state machine;
by the second virtual state machine, emitting a causal signal upon a predetermined event in the second conversation;
by the first virtual state machine, releasing the delayed packet in response to the causal signal.

4. The method of claim 3 wherein the detection of the second conversation is subsequent to the detection of the first conversation.

5. Apparatus having first and second ports with data passing into the first port and out of the second port according to a packet-oriented protocol;
the apparatus having means responsive to arrival of a first packet at the first port for fragmenting the first packet according to a first pattern, and passing said fragments out of the second port;
the apparatus having means responsive to arrival of a second packet at the first port for fragmenting the second packet according to a second pattern different from the first pattern, and passing said fragments out of the second port;
the apparatus having means responsive to arrival of a third packet at the first port for fragmenting the third packet according to a third pattern different from the first pattern and different from the second pattern, and passing said fragments out of the second port.

6. The apparatus of claim 5 further characterized in that data also pass into the second port and out of the first port according to the packet-oriented protocol;
the apparatus having means responsive to arrival of a fourth packet at the second port for fragmenting the fourth packet according to the first pattern, and passing said fragments out of the first port;
the apparatus having means responsive to arrival of a fifth packet at the second port for fragmenting the fifth packet according to the second pattern, and passing said fragments out of the first port;
the apparatus having means responsive to arrival of a sixth packet at the second port for fragmenting the third packet according to the third pattern, and passing said fragments out of the first port.

7. A method for use with apparatus having first and second ports and for use with a packet-oriented protocol, the method comprising the steps of:
receiving a first packet at the first port; fragmenting the first packet according to a first pattern;
passing said fragments out of the second port;
receiving a second packet at the first port;
fragmenting the second packet according to a second pattern different from the first pattern;
passing said fragments out of the second port;
receiving a third packet at the first port;
fragmenting the third packet according to a third pattern different from the first pattern and different from the second pattern; and
passing said fragments out of the second port.

8. The method of claim 7 wherein the first, second, and third packets are received in the order set forth.

9. The method claim 7 further comprising the steps of:
receiving a fourth packet at the second port;
fragmenting the fourth packet according to the first pattern;
passing said fragments out of the first port;
receiving a fifth packet at the second port;
fragmenting the fifth packet according to the second pattern;
passing said fragments out of the first port;
receiving a sixth packet at the second port;
fragmenting the sixth packet according to the third pattern; and
passing said fragments out of the first port.

10. The method of claim 9 wherein the first, second, third, fourth, fifth, and sixth packets are received in the order set forth.

11. Apparatus having first and second ports with data passing into the first port and out of the second port according to a packet-oriented protocol;
the apparatus having means responsive to arrival of a first packet at the first port for fragmenting the first packet according to a first pattern, and passing said fragments out of the second port;
the apparatus having means responsive to arrival of a second packet at the first port for fragmenting the second packet according to a second pattern different from the first pattern, and passing said fragments out of the second port.

12. The apparatus of claim 11 further characterized in that data also pass into the second port and out of the first port according to the packet-oriented protocol;
the apparatus having means responsive to arrival of a fourth packet at the second port for fragmenting the fourth packet according to the first pattern, and passing said fragments out of the first port;
the apparatus having means responsive to arrival of a fifth packet at the second port for fragmenting the fifth packet according to the second pattern, and passing said fragments out of the first port.

13. The apparatus of claim 12 further comprising means responsive to arrival of a sixth packet at the second port for fragmenting the third packet according to the third pattern, and passing said fragments out of the first port.

14. A method for use with apparatus having first and second ports and for use with a packet-oriented protocol, the method comprising the steps of:
receiving a first packet at the first port;
fragmenting the first packet according to a first pattern;
passing said fragments out of the second port;
receiving a second packet at the first port;
fragmenting the second packet according to a second pattern different from the first pattern; and
passing said fragments out of the second port.

15. The method of claim 14 wherein the first and second packets are received in the order set forth.

16. The method of claim 14 wherein the first, second and third packets are received in the order set forth.

17. The method claim 14 further comprising the steps of:
receiving a fourth packet at the second port;
fragmenting the fourth packet according to the first pattern;
passing said fragments out of the first port;
receiving a fifth packet at the second port;
fragmenting the fifth packet according to the second pattern; and
passing said fragments out of the first port.

18. The method of claim 17 further comprising the steps of:
receiving a sixth packet at the second port;
fragmenting the sixth packet according to the third pattern; and
passing said fragments out of the first port.

19. The method of claim 17 wherein the first, second, fourth and fifth packets are received in the order set forth.

20. Apparatus having first and second ports passing data therebetween according to a first packet-oriented protocol;
the apparatus having first means detecting initiation of a first conversation according to a conversation-oriented second packet-oriented protocol overlaid upon the first protocol and, responsive thereto, for creating a respective first virtual state machine;
the apparatus having second means detecting initiation of a second conversation according to the second protocol and, responsive thereto, for creating a respective second virtual state machine;
said second virtual state machine disposed to emit a causal signal upon a predetermined event in the second conversation;
the first virtual state machine disposed, in response to the causal signal, to perform a manipulation upon a packet of the first conversation, the manipulation selected from the set consisting of delay, drop, reordering, corruption, and duplication.

21. The apparatus of claim 20 wherein the initiation of the second conversation is subsequent to the initiation of the first conversation.

22. The apparatus of claim 20 wherein the first conversation passes audio data and the second conversation passes video data.

23. The apparatus of claim 20 wherein the first conversation passes video data and the second conversation passes audio data.

24. A method for use with apparatus having first and second ports passing data therebetween according to a first packet-oriented protocol, and for use with a conversation-oriented second packet-oriented protocol overlaid upon the first protocol, the method comprising the steps of:
    detecting initiation of a first conversation according to the second protocol;
    responsive to the detection, creating a respective first virtual state machine;
    detecting initiation of a second conversation according to the second protocol;
    responsive thereto the detection, creating a respective second virtual state machine;
    by the second virtual state machine, emitting a causal signal upon a predetermined event in the second conversation;
    by the first virtual state machine, in response to the causal signal, performing a manipulation upon a packet of the first conversation, the manipulation selected from the set consisting of delay, drop, reordering, rewriting, modification, re-encapsulation, corruption, and duplication.

25. The method of claim 24 wherein the detection of the second conversation is subsequent to the detection of the first conversation.

26. The method of claim 24 wherein the first conversation passes audio data and the second conversation passes video data.

27. The method of claim 24 wherein the first conversation passes video data and the second conversation passes audio data.

28. Apparatus having first and second ports passing data therebetween according to a packet-oriented protocol;
    the apparatus having first means detecting a first packet of a first predetermined type passing from the second port to the first port;
    the apparatus having second means passing second packets encoded with a first codec from the first port to the second port;
    the second means responsive to detection by the first means, and responsive to subsequent detection by the second means of a predetermined event relating to said second packets, for translating said second packets from being encoded with said first codec to being encoded with a second codec differing from the first codec, as the second packets pass from the first port to the second port.

29. The apparatus of claim 28 wherein the first packet of the first predetermined type is an RTCP receiver report.

30. The apparatus of claim 28 wherein the predetermined event relating to said second packets is the passing of a second packet that is an RTP packet with an M-bit set.

31. A method for use with apparatus having first and second ports and for use with a packet-oriented protocol, the method comprising the steps of:
    detecting a first packet of a first predetermined type passing from the second port to the first port;
    passing second packets encoded with a first codec from the first port to the second port;
    detecting a predetermined event relating to said second packets;
    thereafter translating said second packets from being encoded with said first codec to being encoded with a second codec differing from the first codec, as the second packets pass from the first port to the second port.

32. The method of claim 31 wherein the first packet of the first predetermined type is an RTCP receiver report.

33. The method of claim 31 wherein the predetermined event relating to said second packets is the passing of a second packet that is an RTP packet with an M-bit set.

34. The method of claim 31 further comprising the steps of:
    again detecting a first packet of the first predetermined type passing from the second port to the first port;
    passing second packets encoded with the second codec from the first port to the second port;
    again detecting the predetermined event relating to said second packets;
    thereafter passing the second packets from the first port to the second port without translating them.

35. Apparatus having a port passing data according to a first packet-oriented protocol;
    the apparatus having first means detecting initiation of a first conversation according to a second packet-oriented protocol overlaid upon the first protocol and, responsive thereto, for creating a respective first virtual state machine, the first virtual state machine disposed to delay a packet of the first conversation;
    the apparatus having second means detecting initiation of a second conversation according to the second protocol and, responsive thereto, for creating a respective second virtual state machine;
    said second virtual state machine disposed to emit a causal signal upon a predetermined event in the second conversation;
    the first virtual state machine disposed to release the delayed packet in response to the causal signal.

36. The apparatus of claim 35 wherein the initiation of the second conversation is subsequent to the initiation of the first conversation.

37. A method for use with apparatus having a port passing data according to a first packet-oriented protocol, and for use with a conversation-oriented second packet-oriented protocol overlaid upon the first protocol, the method comprising the steps of:
    detecting initiation of a first conversation according to the second protocol;
    responsive to the detection, creating a respective first virtual state machine;
    by the first virtual state machine, delaying a packet of the first conversation;
    detecting initiation of a second conversation according to the second protocol;
    responsive thereto the detection, creating a respective second virtual state machine;
    by the second virtual state machine, emitting a causal signal upon a predetermined event in the second conversation;
    by the first virtual state machine, releasing the delayed packet in response to the causal signal.

38. The method of claim 37 wherein the detection of the second conversation is subsequent to the detection of the first conversation.

39. Apparatus having a port with data passing through the port according to a packet-oriented protocol;
    the apparatus having means responsive to arrival of a first packet at the port for fragmenting the first packet according to a first pattern, and passing said fragments out of the port;

the apparatus having means responsive to arrival of a second packet at the port for fragmenting the second packet according to a second pattern different from the first pattern, and passing said fragments out of the port;

the apparatus having means responsive to arrival of a third packet at the port for fragmenting the third packet according to a third pattern different from the first pattern and different from the second pattern, and passing said fragments out of the port.

40. A method for use with apparatus having a port for use with a packet-oriented protocol, the method comprising the steps of:

receiving a first packet at the port;
fragmenting the first packet according to a first pattern;
passing said fragments out of the port;
receiving a second packet at the port;
fragmenting the second packet according to a second pattern different from the first pattern;
passing said fragments out of the port;
receiving a third packet at the port;
fragmenting the third packet according to a third pattern different from the first pattern and different from the second pattern; and
passing said fragments out of the port.

41. The method of claim 40 wherein the first, second, and third packets are received in the order set forth.

42. Apparatus having a port passing data according to a first packet-oriented protocol;

the apparatus having first means detecting initiation of a first conversation according to a conversation-oriented second packet-oriented protocol overlaid upon the first protocol and, responsive thereto, for creating a respective first virtual state machine;

the apparatus having second means detecting initiation of a second conversation according to the second protocol and, responsive thereto, for creating a respective second virtual state machine;

said second virtual state machine disposed to emit a causal signal upon a predetermined event in the second conversation;

the first virtual state machine disposed, in response to the causal signal, to perform a manipulation upon a packet of the first conversation, the manipulation selected from the set consisting of delay, drop, reordering, modification, corruption, and duplication.

43. The apparatus of claim 42 wherein the initiation of the second conversation is subsequent to the initiation of the first conversation.

44. The apparatus of claim 42 wherein the first conversation passes audio data and the second conversation passes video data.

45. The apparatus of claim 42 wherein the first conversation passes video data and the second conversation passes audio data.

46. A method for use with apparatus having a port passing data according to a first packet-oriented protocol, and for use with a conversation-oriented second packet-oriented protocol overlaid upon the first protocol, the method comprising the steps of:

detecting initiation of a first conversation according to the second protocol;
responsive to the detection, creating a respective first virtual state machine;
detecting initiation of a second conversation according to the second protocol;
responsive thereto the detection, creating a respective second virtual state machine; by the second virtual state machine, emitting a causal signal upon a predetermined event in the second conversation;
by the first virtual state machine, in response to the causal signal, performing a manipulation upon a packet of the first conversation, the manipulation selected from the set consisting of delay, drop, reordering, rewriting, modification, re-encapsulation, corruption, and duplication.

47. The method of claim 46 wherein the detection of the second conversation is subsequent to the detection of the first conversation.

48. The method of claim 46 wherein the first conversation passes audio data and the second conversation passes video data.

49. The method of claim 46 wherein the first conversation passes video data and the second conversation passes audio data.

50. Apparatus having a port passing data according to a packet-oriented protocol;

the apparatus having first means detecting a first packet of a first predetermined type received at the port and transmitted at the port;

the apparatus having second means passing second packets encoded with a first codec received at the port and transmitted at the port;

the second means responsive to detection by the first means, and responsive to subsequent detection by the second means of a predetermined event relating to said second packets, for translating said second packets from being encoded with said first codec to being encoded with a second codec differing from the first codec, as the second packets are received at the port and transmitted at the port.

51. The apparatus of claim 50 wherein the first packet of the first predetermined type is an RTCP receiver report.

52. The apparatus of claim 50 wherein the predetermined event relating to said second packets is the passing of a second packet that is an RTP packet with an M-bit set.

53. A method for use with apparatus having a port and for use with a packet-oriented protocol, the method comprising the steps of:

detecting a first packet of a first predetermined type received at the port and transmitted at the port;
passing second packets encoded with a first codec received at the port and transmitted at the port;
detecting a predetermined event relating to said second packets;
thereafter translating said second packets from being encoded with said first codec to being encoded with a second codec differing from the first codec, as the second packets are received at the port and transmitted at the port.

54. The method of claim 53 wherein the first packet of the first predetermined type is an RTCP receiver report.

55. The method of claim 53 wherein the predetermined event relating to said second packets is the passing of a second packet that is an RTP packet with an M-bit set.

56. The method of claim 53 further comprising the steps of:

again detecting a first packet of the first predetermined type received at the port and transmitted at the port;
passing second packets encoded with the second codec received at the port and transmitted at the port;
again detecting the predetermined event relating to said second packets;
thereafter passing the second packets received at the port and transmitted at the port without translating them.

* * * * *